(12) United States Patent
Cho

(10) Patent No.: US 7,199,533 B2
(45) Date of Patent: Apr. 3, 2007

(54) CONVERGENCE CONTROL APPARATUS FOR VIDEO DISPLAY

(75) Inventor: Jang Ho Cho, Kyungsangbook-do (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 11/053,909

(22) Filed: Feb. 10, 2005

(65) Prior Publication Data

US 2005/0179407 A1   Aug. 18, 2005

(30) Foreign Application Priority Data

Feb. 12, 2004   (KR) .................. 10-2004-0009207

(51) Int. Cl.
*H01J 29/51* (2006.01)
*H04N 9/28* (2006.01)
*H04N 5/10* (2006.01)

(52) U.S. Cl. ............... 315/368.28; 348/530; 348/807

(58) Field of Classification Search .......... 315/368.11, 315/368.28; 348/525, 529, 531, 532, 687, 348/707, 807, 530

See application file for complete search history.

(56) References Cited

U.S. PATENT DOCUMENTS

| | | | | |
|---|---|---|---|---|
| 4,318,032 A | * | 3/1982 | Kureha ................ | 315/368.18 |
| 4,816,908 A | * | 3/1989 | Colineau et al. ........... | 348/747 |
| 4,935,674 A | * | 6/1990 | Rodriguez-Cavazos | 315/368.13 |
| 4,961,030 A | | 10/1990 | Ogino et al. ........... | 315/368.23 |
| 4,977,446 A | * | 12/1990 | Shiomi et al. ............. | 348/747 |
| 5,430,357 A | | 7/1995 | Ogino et al. ........... | 315/368.13 |
| 5,434,484 A | * | 7/1995 | Murakami ................ | 315/371 |
| 5,523,789 A | * | 6/1996 | Oguchi et al. ............. | 348/448 |
| 5,627,605 A | * | 5/1997 | Kim ........................ | 348/745 |
| 6,753,932 B2 | * | 6/2004 | Ishii et al. ................ | 348/807 |
| 7,034,900 B2 | * | 4/2006 | Yoshizawa et al. ......... | 348/807 |

FOREIGN PATENT DOCUMENTS

| | | |
|---|---|---|
| EP | 1 061 733 A1 | 12/2000 |
| JP | 61-63177 | 4/1986 |
| JP | 04-054091 | 2/1992 |
| JP | 09-102961 | 4/1997 |
| JP | 10-145803 | 5/1998 |
| JP | 2001-45321 A | 2/2001 |

* cited by examiner

*Primary Examiner*—Thuy Vinh Tran
(74) *Attorney, Agent, or Firm*—Birch, Stewart, Kolasch & Birch, LLP

(57) ABSTRACT

A convergence control apparatus for a video display is provided. In the apparatus, a convergence controller receives a vertical synchronization signal and a horizontal synchronization signal and then outputs a vertical convergence correction voltage and a horizontal convergence correction voltage. An amplifier receives and amplifies the vertical convergence correction voltage and the horizontal convergence correction voltage. A correction current generator receives the amplified vertical convergence correction voltage and the amplified horizontal convergence correction voltage and then generates a vertical convergence correction current and a horizontal convergence correction current. A switching unit controls the vertical convergence correction voltage and the horizontal convergence correction voltage according to the horizontal synchronization signal.

14 Claims, 4 Drawing Sheets

CONVERGENCE CONTROL APPARATUS FOR VIDEO DISPLAY

BACKGROUND OF THE INVENTION

1. Field of the Invention

The present invention relates to a convergence control apparatus for a video display, and more particularly, to a convergence control apparatus for a projection video display, which makes it possible to control a convergence discriminately for a scanning period and a blanking period (or a flyback period).

2. Description of the Related Art

A video display has been developed from a 14-inch analog television (TV) now to a projection TV of 60 or more inches.

The projection TV is a device that projects RGB-color images on a screen by using respective projection TV Braun tubes.

The sensitive quality of the projection TV includes various items such as white uniformity (W/U), bright uniformity (B/U), convergence, a focus, distortion, and so on.

Here, the convergence is the occurrence of RGB beams projected by projection TV Braun tubes being focused at a point of a screen. However, when the projected RGB beams are undesirably deflected due to the malfunction of a deflection yoke and an effect of a magnetic field, mis-convergence occurs, whereby a color divergence occurs on a screen.

That is, if the projected RGB beams are accurately focused at a point of a screen (accurate convergence), a normal white color can be represented. Otherwise, if the projected RGB beams are not accurately focused at a point (mis-convergence), abnormal RGB-colored lines occur near a white line to thereby cause the deterioration of a picture quality.

A related art convergence control apparatus for a video display will now be described with reference to FIGS. 1 through 3.

FIG. 1 illustrates a related art convergence control apparatus for a projection TV.

Referring to FIG. 1, the convergence control apparatus includes a convergence controller 10 for receiving a vertical synchronization signal (Vsync) and a horizontal synchronization signal (Hsync) and then generating and outputting a vertical convergence correction voltage and a horizontal convergence correction voltage, an amplifier 20 for receiving and amplifying the vertical convergence correction voltage and the horizontal convergence correction voltage, and a correction current generator 30 for receiving the amplified vertical convergence correction voltage and the amplified horizontal convergence correction voltage and then generating a vertical convergence correction current and a horizontal convergence correction current.

Here, the amplifier 20 includes a first amplifier (Amp1) for amplifying the vertical convergence correction voltage from the convergence controller 10, and a second amplifier (Amp2) for amplifying the horizontal convergence correction voltage from the convergence controller 10.

Also, the correction current generator 30 includes a first coil (L1) for converting the amplified vertical convergence correction voltage into the vertical convergence correction current, and a second coil (L2) for converting the amplified horizontal convergence correction voltage into the horizontal convergence correction current.

FIG. 2 illustrates an exemplary waveform in the convergence control apparatus shown in FIG. 1.

Referring to FIG. 2, a horizontal synchronization signal (Hsync) 21 received from the convergence controller 10 has an about 31 KHz frequency, and a vertical synchronization signal (Vsync) (not shown) received from the convergence controller 10 has an about 60 Hz frequency.

The vertical convergence correction voltage 22 and the horizontal convergence correction voltage 23 are generated from the convergence controller 10, respectively based on the Vsync and the Hsync 21.

The generated vertical and horizontal convergence correction voltages 22 and 23 are amplified by the amplifier 20, and the amplified vertical and horizontal convergence correction voltages are respectively converted into a vertical convergence correction current 24 and a horizontal convergence correction current 25 by the correction current generator 30.

The vertical and horizontal convergence correction currents 24 and 25 affect a deflection yoke of the protection TV, whereby the convergence of a video can be controlled in the projection TV.

However, since the above-constructed convergence control apparatus is operated in such a way that the vertical and horizontal convergence correction currents 24 and 25 are all applied to a convergence coil thereof without discriminating a scanning period from a blanking period, an unnecessary voltage overheats the amplifier 20.

Accordingly, the amplifier 20 should be additionally equipped with a radiation plate for radiating the overheated heat.

That is, the vertical and horizontal convergence correction currents 24 and 25 are unnecessarily applied to the convergence coil also in the blanking period, whereby an unnecessary voltage overheats the amplifier 20. Also, the unnecessarily-applied convergence correction currents may cause an erroneous convergence correction for the blanking period, whereby undesirable traces (or afterimages) may be generated on a screen.

FIG. 3A illustrates a case where video convergence is corrected by an applied convergence correction current in a scanning period, FIG. 3B illustrates a case where video convergence is reverse-corrected by an applied convergence correction current in a blanking period, and FIG. 3C illustrates a case where a convergence correction current is not applied in scanning and blanking periods.

In case where video convergence is not corrected, a scanning and a flyback are performed as shown in FIG. 3C. On the contrary, in case where video convergence is corrected, a scanning is performed as shown in FIG. 3A and a flyback is performed as shown in FIG. 3B.

Consequently, although a convergence correction during the blanking period shown in FIG. 3B is not necessarily needed, a convergence correction is unnecessarily performed also in the blanking period whereby the amplifier 20 is unnecessarily overheated.

SUMMARY OF THE INVENTION

Accordingly, the present invention is directed to a convergence control apparatus for a video display that substantially obviates one or more problems due to limitations and disadvantages of the related art.

An object of the present invention is to provide a convergence control apparatus for a video display, which can prevent an unnecessary convergence correction by preventing a convergence correction from being performed during the blanking period.

Another object of the present invention is to provide a convergence control apparatus for a video display, which can prevent an amplifier being overheated by prevent an unnecessary convergence correction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a convergence control apparatus for a video display includes: a convergence controller for receiving a vertical synchronization signal and a horizontal synchronization signal and then outputting a vertical convergence correction voltage and a horizontal convergence correction voltage; an amplifier for receiving and amplifying the vertical convergence correction voltage and the horizontal convergence correction voltage; a correction current generator for receiving the amplified vertical convergence correction voltage and the amplified horizontal convergence corrections voltage and then generating a vertical convergence correction current and a horizontal convergence correction current; and a switching unit for controlling the vertical convergence correction voltage and the horizontal convergence correction voltage, based on the horizontal synchronization signal.

In another aspect of the present invention, a convergence control apparatus for a video display includes: a convergence controller for outputting a vertical convergence correction voltage and a horizontal convergence correction voltage according to a vertical synchronization signal and a horizontal synchronization signal; an amplifier for receiving and amplifying the vertical convergence correction voltage and the horizontal convergence correction voltage; a correction current generator for receiving the amplified vertical convergence correction voltage and the amplified horizontal convergence correction voltage and then generating a vertical convergence correction current and a horizontal convergence correction current; and a switching unit for making the vertical convergence correction voltage and the horizontal convergence correction voltage applied to the amplifier discriminately according to a scanning period and a blanking period.

In a further aspect of the present invention, a convergence control apparatus for a video display includes: a convergence controller for receiving a vertical synchronization signal and a horizontal synchronization signal and then outputting vertical convergence correction voltage and a horizontal convergence correction voltage; an amplifier for receiving and amplifying the vertical convergence correction voltage and the horizontal convergence correction voltage; a correction current generator for receiving the amplified vertical convergence correction voltage and the amplified horizontal convergence correction voltage and then generating a vertical convergence correction current and a horizontal convergence correction current; and a switching unit for controlling the vertical convergence correction voltage and the horizontal convergence correction voltage, based on the horizontal synchronization signal and the vertical synchronization signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further Understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
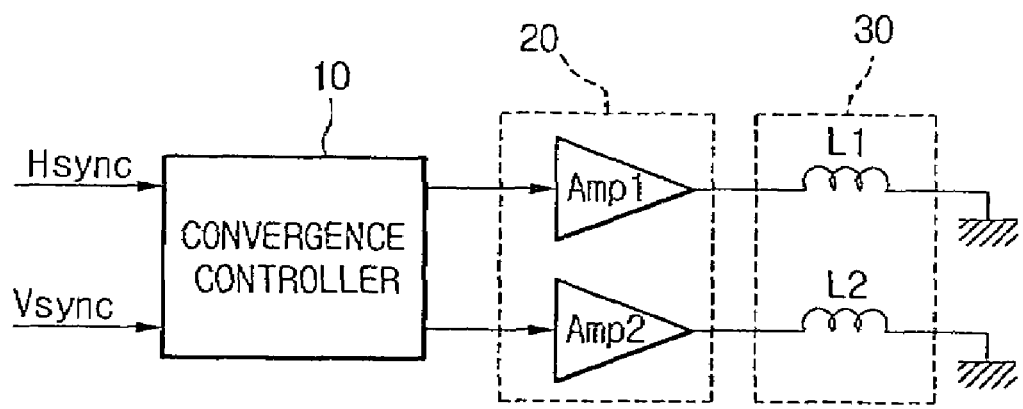
FIG. 1 is a block diagram of a related art convergence control apparatus for a projection TV.
Figure 2:
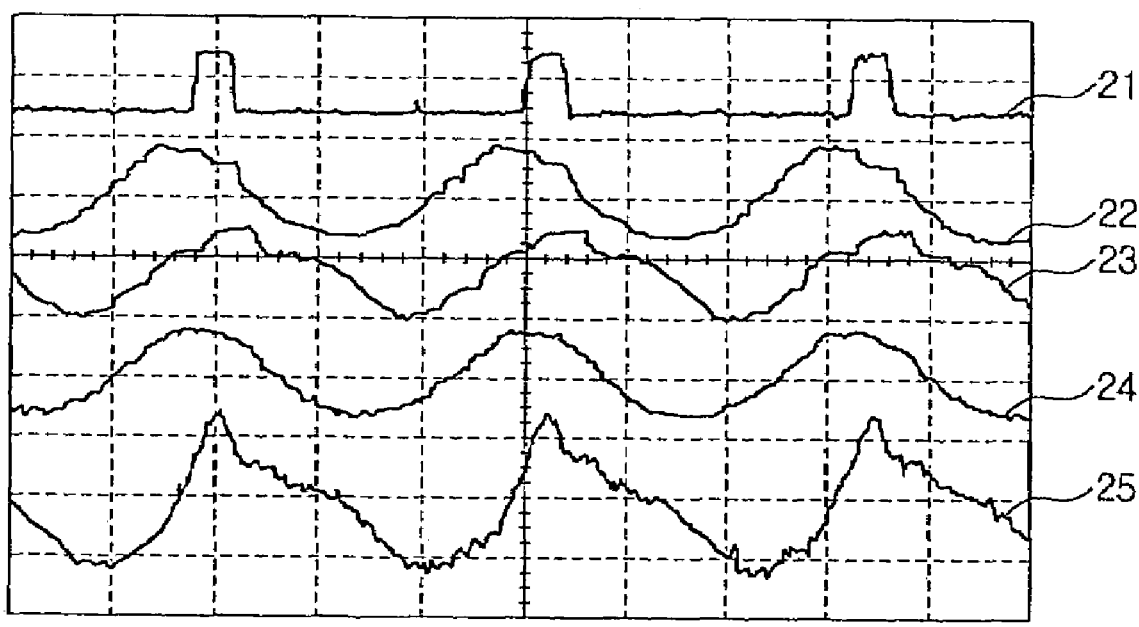
FIG. 2 is a graph illustrating, an exemplary waveform in the convergence control apparatus shown in FIG. 1.
Figure 3A:
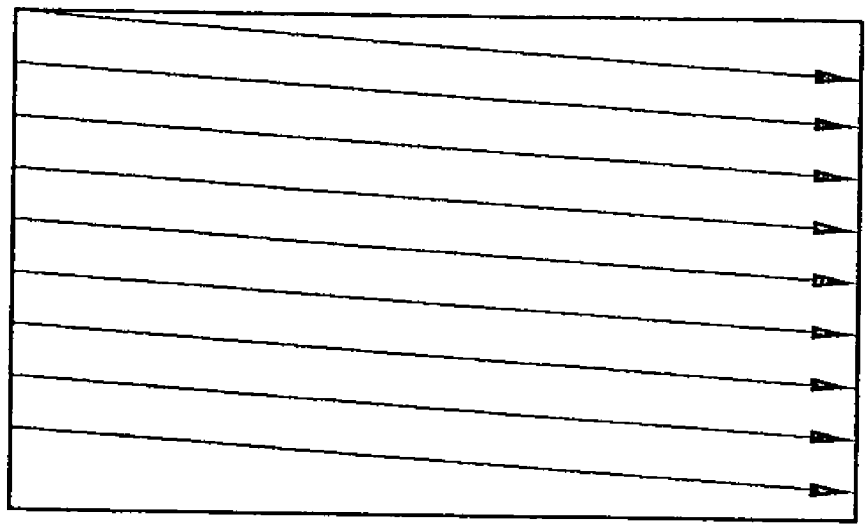
FIG. 3A is a diagram illustrating a case where video convergence is corrected by an applied convergence correction current in a scanning period.
Figure 3B:
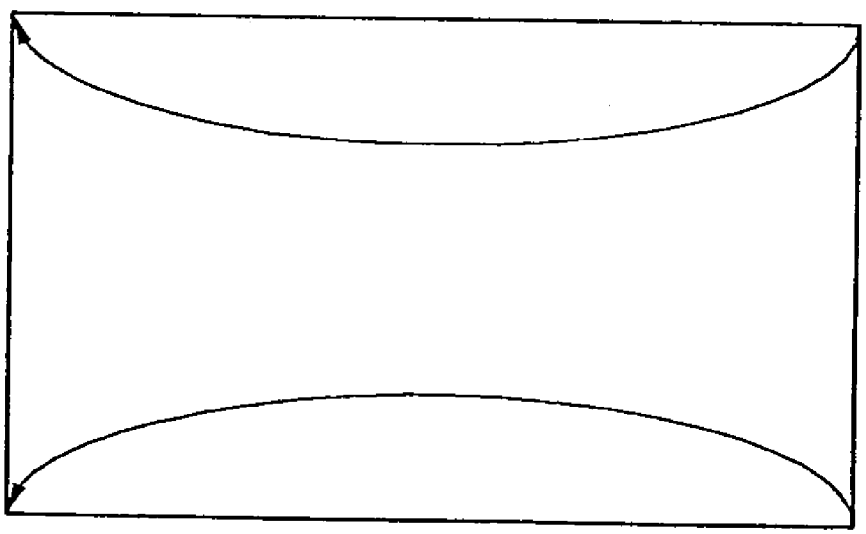
FIG. 3B is a diagram illustrating a case where video convergence is reverse-corrected by an applied convergence correction current in a blanking period.
Figure 3C:
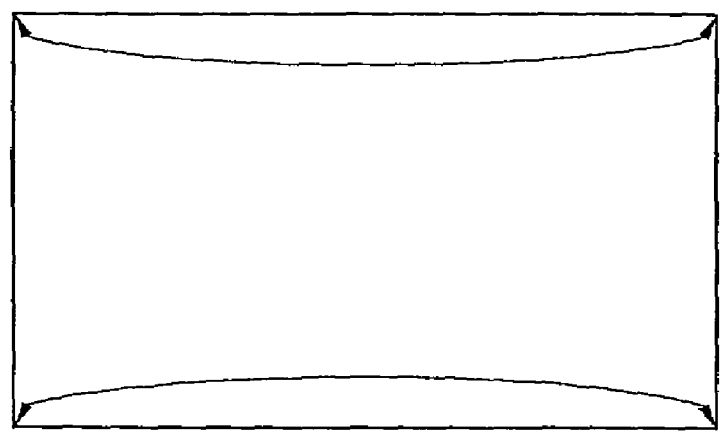
FIG. 3C is a diagram illustrating a case where a convergence correction current is not applied in scanning and blanking periods.
Figure 4:
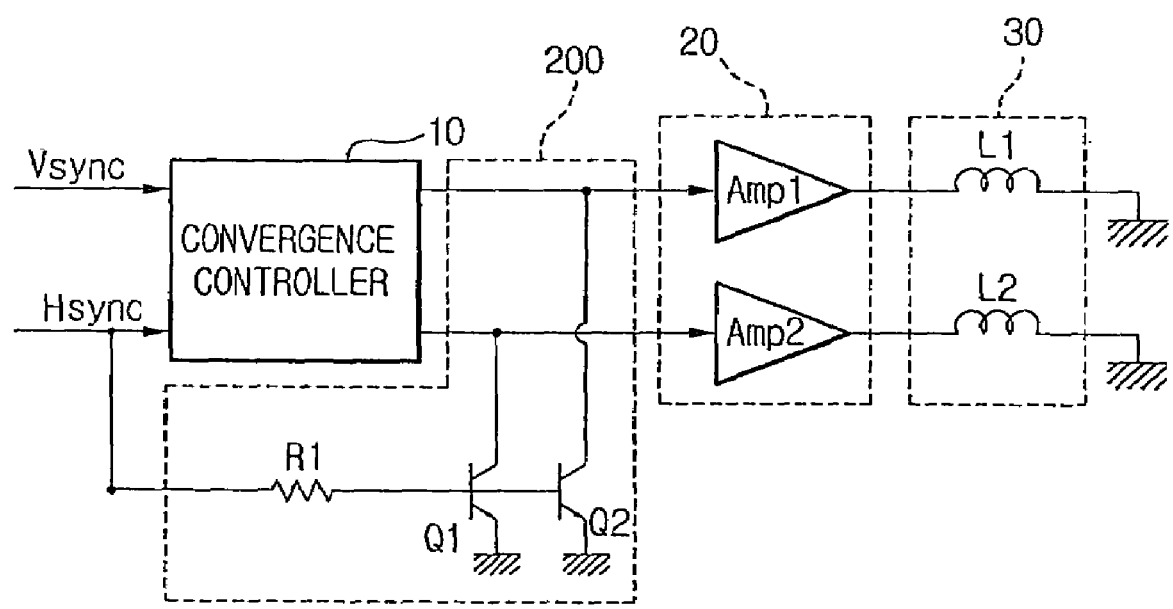
FIG. 4 is a block diagram of a convergence control apparatus for a video display according to an embodiment of the present invention.
Figure 5:
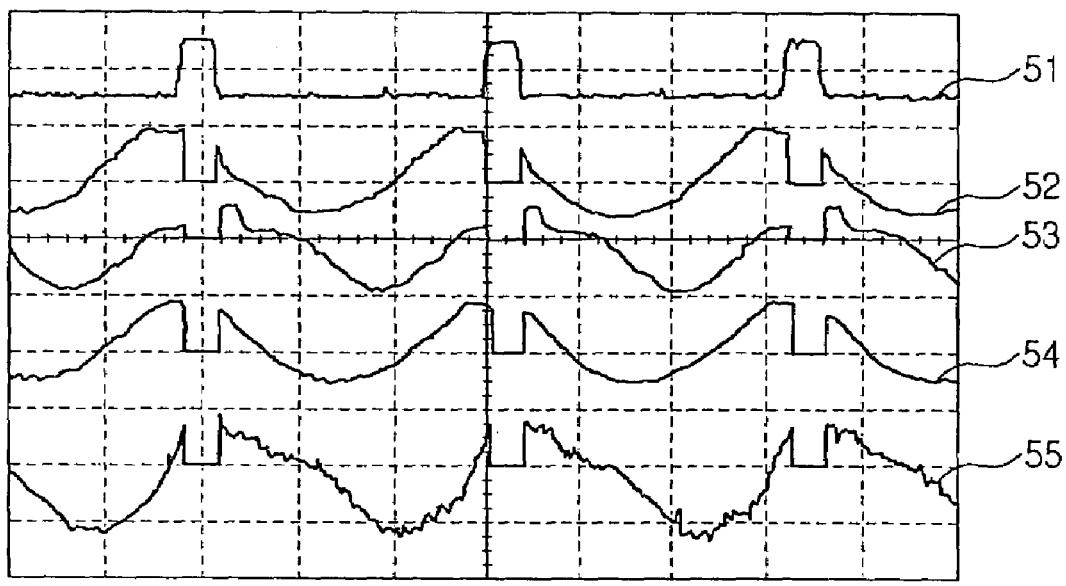
FIG. 5 is a graph illustrating an exemplary waveform in the convergence control apparatus shown in FIG. 4.

FIG. 4 illustrates a convergence control apparatus for a video display according to a first embodiment of the present invention, and FIG. 5 illustrates an exemplary waveform in the convergence control apparatus shown in FIG. 4.

Referring to FIGS. 4 and 5, the inventive convergence control apparatus includes a convergence controller 10 for receiving a vertical synchronization signal (Vsync) and a horizontal synchronization signal (Hsync) 51 and then outputting a vertical convergence correction voltage 52 and a horizontal convergence correction voltage 53, an amplifier 20 for receiving and amplifying the vertical convergence correction voltage 52 and the horizontal convergence correction voltage 53, a correction current generator 30 for receiving the amplified vertical convergence correction voltage and the amplified horizontal convergence correction voltage and then generating a vertical convergence correction current 54 and a horizontal convergence correction current 55, and a switching unit 200 for controlling the vertical convergence correction voltage 52 and the horizontal convergence correction voltage 53 outputted to the amplifier 20, depending on the horizontal synchronization signal 51 (Hsync).

Here, the amplifier 20 includes a first amplifier (Amp1) for amplifying the vertical convergence correction voltage 52 from the convergence controller 10, and a second amplifier (Amp2) for amplifying the horizontal convergence correction voltage 53 from the convergence controller 10. The correction current generator 30 includes a first coil (L1) whose input port is connected to an output port of the first amplifier (Amp1), and a second coil (L2) whose input port is connected to an output port of the second amplifier (Amp2).

The horizontal synchronization signal (Hsync) 51 has an about 31 KHz frequency, and the vertical synchronization signal (Vsync) has an about 60 Hz frequency.

The convergence controller 10 generates and outputs the vertical convergence correction voltage 52 and the horizontal convergence correction voltage 53, based on the horizontal synchronization signal (Hsync) 51 and the vertical synchronization signal (Vsync).

The vertical and horizontal convergence correction voltages 52 and 53 passing through the switching unit 200 is shown in FIG. 5. It can be seen from FIG. 5 that the voltages 52 and 53 are 0 V while the Hsync signal 51 is in a high state.

Accordingly, also the vertical and horizontal convergence correction currents 54 and 55 are not generated while the Hsync signal 51 is in a high state.

The switching unit 200 may include a resistor (R1) and two transistors (Q1 and Q2). Further, the resistor R1 has an end connected to a horizontal synchronization signal input port of the convergence controller 10, the transistor Q2 has a base grounded and connected to the other end of the resistor R1 and a collector connected to a vertical convergence correction voltage output port of the convergence controller 10, and the transistor Q1 has a base grounded and connected to the other end of the resistor R1 and a collector connected to a horizontal convergence correction voltage output port of the convergence controller 10.

The switching unit 200 is connected respectively to input and output ports of the convergence controller 10, thereby making the output port of the convergence controller 10 grounded while the Hsync signal 51 is in a high state.

Since the Hsync signal 51 maintains a high state in a blanking period, the vertical and horizontal convergence correction voltages 52 and 53 are not applied to the amplifier 20 during the blanking period.

An operation of the convergence control apparatus will now be described.

When the Vsync signal and the Hsync signal 51 is applied, the convergence controller 10 generates and outputs the vertical and horizontal convergence correction voltages 52 and 53 according to the applied Vsync and Hsync signals.

Simultaneously, the Hsync signal 51 are also applied to the switching unit 200 and a current is applied to bases of the transistors Q1 and Q2, whereby the transistors are turned on and the vertical and horizontal convergence correction voltages 52 and 53 are grounded. Accordingly, power is not applied to the amplifier 20.

That is, as shown in FIG. 5, the vertical and horizontal convergence correction voltages 52 and 53 inputted to the amplifier 20 are controlled according to the Hsync signal 51, and the current outputted from the correction current generator 30 is controlled.

Accordingly, a convergence correction is not performed during the blanking period, whereby an unnecessary voltage is not applied to the amplifier 20.

Figure 6:
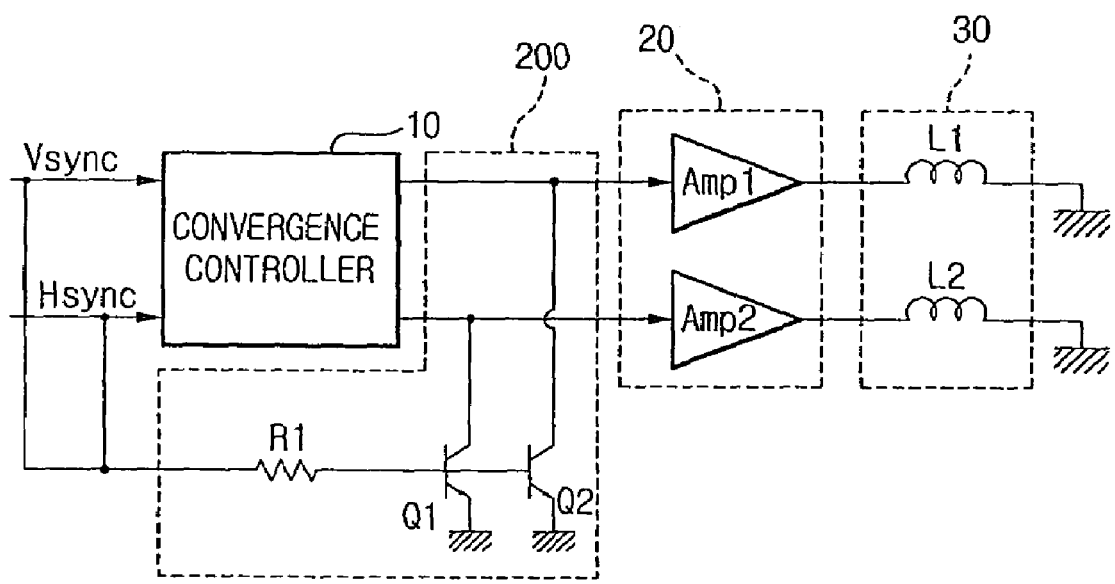
FIG. 6 is a block diagram of a convergence control apparatus for a video display according to another embodiment of the present invention.

FIG. 6 illustrates a convergence control apparatus for a video display according to a second embodiment of the present invention.

Referring to FIG. 6, the switching unit 200 receives the Vsync signal as well as the Hsync signal. Accordingly, when the Vsync signal or the Hsync signal is in a high state (that is, a vertical blanking period, the vertical and horizontal convergence correction voltages 52 and 53 are not outputted from the convergence controller 10.

In this case, when the Vsync signal is in a high state (the Vsync signal is in a high state less frequently than the Hsync signal), the vertical and horizontal convergence correction voltages 52 and 53 become 0 V. Accordingly, an unnecessary voltage is not applied to the amplifier 20.

Since the vertical and horizontal convergence correction voltages 52 and 53 are not outputted when the Vsync signal and/or the Hsync signal are/is in a high state in the second embodiment, the second embodiment has a performance superior to that of the first embodiment.

As described above, the inventive convergence control apparatus prevents an unnecessary voltage from being applied to the amplifier 20, thereby making it possible to reduce heat generated in the amplifier 20. Accordingly, a radiation plate installed in the amplifier 20 can be reduced in size.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A convergence control apparatus for a video display, comprising:
   a convergence controller for receiving a vertical synchronization signal and a horizontal synchronization signal and then outputting a vertical convergence correction voltage and a horizontal convergence correction voltage;
   an amplifier for receiving and amplifying the vertical convergence correction voltage and the horizontal convergence correction voltage;
   a correction current generator for receiving the amplified vertical convergence correction voltage and the amplified horizontal convergence correction voltage and then generating a vertical convergence correction current and a horizontal convergence correction current; and
   a switching unit for controlling the vertical convergence correction voltage and the horizontal convergence correction voltage, based on the horizontal synchronization signal.

2. The apparatus according to claim 1, wherein the amplifier comprises:
   a first amplifier for amplifying the vertical convergence correction voltage; and
   a second amplifier for amplifying the horizontal convergence correction voltage.

3. The apparatus according to claim 1, wherein the correction current generator comprises:
   a first coil for receiving the amplified vertical convergence correction voltage and then generating the vertical convergence correction current; and
   a second coil for receiving the amplified horizontal convergence correction voltage and then generating the horizontal convergence correction current.

4. The apparatus according to claim 1, wherein the switching unit makes an output port of the convergence controller grounded while the horizontal synchronization signal is in a high state.

5. The apparatus according to claim 1, wherein the switching unit comprises:

a resistor having an end connected to an horizontal synchronization signal input port of the convergence controller;

a first transistor having an emitter grounded and connected to another end of the resistor, and a collector connected to a vertical convergence correction voltage output port of the convergence controller; and a second transistor having an emitter grounded and connected to the another end of the resistor, and a collector connected to a horizontal convergence correction voltage output port of the convergence controller.

6. A convergence control apparatus for a video display, comprising:

a convergence controller for outputting a vertical convergence correction voltage and a horizontal convergence correction voltage according to a vertical synchronization signal and a horizontal synchronization signal;

an amplifier for receiving and amplifying the vertical convergence correction voltage and the horizontal convergence correction voltage;

a correction current generator for receiving the amplified vertical convergence correction voltage and the amplified horizontal convergence correction voltage and then generating a vertical convergence correction current and a horizontal convergence correction current; and a switching unit for making the vertical convergence correction voltage and the horizontal convergence correction voltage applied to the amplifier discriminately according to a scanning period and a blanking period.

7. The apparatus according to claim 6, wherein the switching unit makes an output port of the convergence controller grounded while the horizontal synchronization signal is in a high state.

8. The apparatus according to claim 6, wherein the switching unit comprises:

a resistor having an end connected to an horizontal synchronization signal input port of the convergence controller;

a first transistor having an emitter grounded and connected to another end of the resistor, and a collector connected to a vertical convergence correction voltage output port of the convergence controller; and a second transistor having an emitter grounded and connected to the another end of the resistor, and a collector connected to a horizontal convergence correction voltage output port of the convergence controller.

9. A convergence control apparatus for a video display, comprising:

a convergence controller for receiving a vertical synchronization signal and a horizontal synchronization signal and then outputting a vertical convergence correction voltage and a horizontal convergence correction voltage;

an amplifier for receiving and amplifying the vertical convergence correction voltage and the horizontal convergence correction voltage;

a correction current generator for receiving the amplified vertical convergence correction voltage and the amplified horizontal convergence correction voltage and then generating a vertical convergence correction current and a horizontal convergence correction current; and a switching unit for controlling the vertical convergence correction voltage and the horizontal convergence correction voltage, based on the horizontal synchronization signal and the vertical synchronization signal.

10. The apparatus according to claim 9, wherein the amplifier comprises:

a first amplifier for amplifying the vertical convergence correction voltage; and a second amplifier for amplifying the horizontal convergence correction voltage.

11. The apparatus according to claim 9, wherein the correction current generator comprises:

a first coil for receiving the amplified vertical convergence correction voltage and then generating a vertical convergence correction current; and a second coil for receiving the amplified horizontal convergence correction voltage and then generating a horizontal convergence correction current.

12. The apparatus according to claim 9, wherein the switching unit makes an output port of the convergence controller grounded while the horizontal synchronization signal or the vertical synchronization signal is in a high state.

13. The apparatus according to claim 9, wherein the switching unit makes the vertical convergence correction voltage and the horizontal convergence correction voltage be 0 V while the horizontal synchronization signal or the vertical synchronization signal is in a high state.

14. The apparatus according to claim 9, wherein the switching unit comprises:

a resistor having an end connected to an horizontal synchronization signal input port of the convergence controller;

a first transistor having an emitter grounded and connected to another end of the resistor, and a collector connected to a vertical convergence correction voltage output port of the convergence controller; and a second transistor having an emitter grounded and connected to the another end of the resistor, and a collector connected to a horizontal convergence correction voltage output port of the convergence controller.

* * * * *